(12) United States Patent
Schlechter et al.

(10) Patent No.: US 9,892,574 B2
(45) Date of Patent: Feb. 13, 2018

(54) METHOD FOR MONITORING ACCESS AUTHORIZATIONS BY AN ACCESS MONITORING SYSTEM

(71) Applicant: SKIDATA AG, Grödig/Salzburg (AT)

(72) Inventors: Thomas Schlechter, Seekirchen am Wallersee (AT); Reinhard Surkau, Traunstein (DE); Michael Heider, Großgmain (AT); Christian Lang, Haigermoos (AT); Jorge Juan Clemente Diaz, Puch bei Hallein (AT)

(73) Assignee: SKIDATA AG, Grödig/Salzburg (AT)

( * ) Notice: Subject to any disclaimer, the term of this patent is extended or adjusted under 35 U.S.C. 154(b) by 0 days.

(21) Appl. No.: 15/392,525

(22) Filed: Dec. 28, 2016

(65) Prior Publication Data
US 2017/0186253 A1  Jun. 29, 2017

(30) Foreign Application Priority Data
Dec. 29, 2015 (EP) .................................... 15202991

(51) Int. Cl.
*G07C 9/00* (2006.01)
*H04N 13/02* (2006.01)

(52) U.S. Cl.
CPC ...... *G07C 9/00079* (2013.01); *G07C 9/00111* (2013.01); *H04N 13/0282* (2013.01); *G07C 2209/63* (2013.01)

(58) Field of Classification Search
CPC ............ G07C 9/00079; G07C 2209/63; H04N 13/0282

(Continued)

(56) References Cited

U.S. PATENT DOCUMENTS 9,516,503 B2 *  12/2016  Berns ................... H04W 12/08
9,633,493 B2 *   4/2017  Raina .................. G07C 9/00007
(Continued)

FOREIGN PATENT DOCUMENTS

DE   102004042999 A1     3/2006
DE   102009000006 A1 *   7/2010  ......... G07C 9/00111
(Continued)

OTHER PUBLICATIONS

European Search Report issued in corresponding European Patent Application No. 15202991.4 dated Jun. 17, 2016.

*Primary Examiner* — Hirdepal Singh
(74) *Attorney, Agent, or Firm* — Davis & Bujold PLLC; Michael J. Bujold

(57) ABSTRACT

A method of monitoring access authorizations by an access monitoring system by a first method, the data carriers or the mobile electronic devices, on which a valid access authorization or an ID is assigned, are detected and the carriers/devices current positions are determined by trilateration or multilateration. A second imaging method is executed, parallel to the first method, and the current position of all persons presented in the entry area is detected by cameras. All persons, with and without valid access authorization, in the entry area are detected so that an ID map and a people map are created. The ID map corresponds to people who have valid access authorization and the people map corresponds everybody in the entry area. An overlay map is created by matching the ID map with the people map, to identify persons with valid access authorization or ID and the people without valid access authorization.

8 Claims, 1 Drawing Sheet

(58) Field of Classification Search
USPC .......................................................... 340/5.53
See application file for complete search history.

(56) References Cited

U.S. PATENT DOCUMENTS

| | | | |
|---|---|---|---|
| 2004/0153671 A1* | 8/2004 | Schuyler | G07C 9/00111 726/9 |
| 2013/0201286 A1* | 8/2013 | Schockmel | G07C 9/00111 348/46 |
| 2017/0046891 A1* | 2/2017 | Trivelpiece | G07C 9/00111 |
| 2017/0103647 A1* | 4/2017 | Davis | G08C 23/04 |

FOREIGN PATENT DOCUMENTS

| | | |
|---|---|---|
| EP | 0940775 A2 | 9/1999 |
| EP | 1752931 A1 | 2/2007 |
| WO | 2010076067 A1 | 7/2010 |
| WO | 2011128408 A1 | 10/2011 |

* cited by examiner

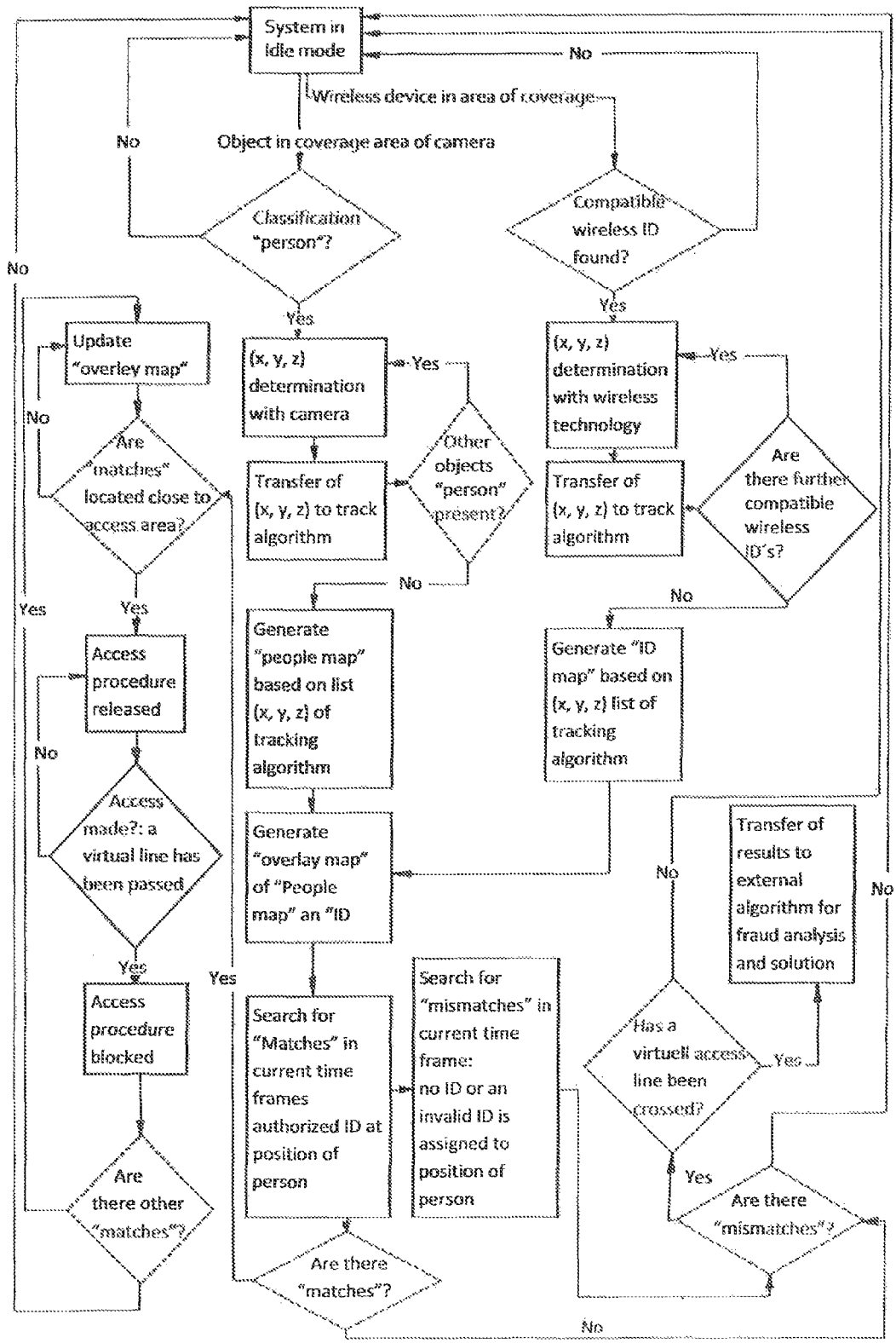

METHOD FOR MONITORING ACCESS AUTHORIZATIONS BY AN ACCESS MONITORING SYSTEM

This application claims priority from European Application Serial No. 15202991.4 filed Dec. 29, 2015.

The present invention relates to a method for monitoring access authorizations by an access monitoring system.

BACKGROUND

Access monitoring devices for persons are known from the prior art which comprise means for preferably contactless detection and for evaluation of access authorizations as well as mechanical or otherwise designed barriers, for example in the form of turnstiles or so-called flap gates, where the barriers are only actuated automatically or manually in the opening direction after presenting a valid access authorization.

Furthermore, access authorizations are known for vehicles which also comprise means for detecting and evaluating access authorizations as well as barriers in the form of vehicle barriers which are actuated in the opening direction after presentation of a valid access authorization.

Disadvantageously as a result of the barriers and the associated blockade of access, the access is configured to be uncomfortable. In particular in the case of access control devices for persons, the presence of barriers is perceived to be unpleasant. Furthermore the access monitoring executed in conjunction with the barriers results in stress with the result than, for example in ski areas, the enjoyment of leisure is disadvantageously significantly impaired.

Furthermore, this type of access monitoring also proves to be inefficient and costly for the operator of the means of transport or leisure devices in which the access monitoring described initially is executed since usually the vast majority of the uses are in possession of a valid access authorization. According to the prior art, all users are monitored in order to determine a usually very small proportion of fare dodgers or users having an invalid access authorization, which on the one hand is associated with a high expenditure and on the other hand leads to delays with access.

SUMMARY

It is the object of the present invention to provide a method for monitoring access authorizations as a result of the implementation of which, barriers are omitted and comfort is increased without the quality of the monitoring of the access authorizations being adversely affected.

Accordingly a method for monitoring access authorizations by an access monitoring system is proposed in the course of which access authorizations or IDs, to which at least one access authorization is unambiguously assigned, stored on data carriers or mobile electronic devices, are detected contactlessly and read out by means of reading devices connected to a local or central, possibly geographically remote server, wherein in each entry area of the access monitoring system, a plurality of cameras connected to the server are provided, which cover the entire entry area wherein in the course of a first method, the current position of the data carrier or the mobile electronic device is determined by at least three reading devices by trilateration or multilateration by means of detecting the data carrier or the mobile electronic device on which a valid access authorization or an ID to which a valid access authorization is unambiguously assigned is stored and wherein by means of a second imaging method which is carried out parallel to the first method, the current position of all persons present in the entry area of the access monitoring system is detected by means of the cameras.

The coverages of the reading devices and the cameras are identical within the framework of the usual tolerances.

The first method can preferably be a method in the course of which data carriers or mobile electronic devices transmit via the Bluetooth low energy standard (BLE) in the course of a "broadcasting" at regular intervals an ID to which at least one access authorization is unambiguously assigned or data of an access authorization which is received by BLE transmission-receiving units connected to a computer comprising a CPU and storage means in range of the mobile electronic device or the data carrier.

Here the localization of the mobile electronic device or the data carrier is made by determining the distance between the mobile electronic device and the BLE transmission-receiving units by means of a reference signal strength which usually corresponds to the signal strength at a meter distance and which is contained as information in the signal of the mobile electronic device or the data carrier or is stored in a table stored in the computer depending on the mobile electronic device or the data carrier, wherein then a trilateration or in the case of more than three BLE transmission-receiving units, a multilateration is performed.

By using the long-range energy-saving BLE standard, IDs to which access authorizations are unambiguously assigned, transmitted by mobile electronic devices such as smartphones, tablets or smartwatches or by data carriers such as, for example RFID cards, are received by BLE transmission-receiving units without significantly increasing the power consumption. After receiving an ID from at least one BLE transmission-receiving unit, it is checked whether this ID is assigned a valid access authorization, wherein this evaluation is made in a computer connected to the BLE transmission-receiving unit or in a server connected to the computer. This ID can, for example, be a serial number of the mobile electronic device or the data carrier. If the data carrier or the mobile electronic device transmit data of an access authorization, the access authorization is checked for validity.

Alternatively to carrying out the first method by means of the BLE standard, other suitable standards can also be used to carry out the first method such as, for example the UWB standard (ultra-wideband) for near-range communication which enables a localization of the data carrier or the mobile electronic device similar to the BLE standard with high accuracy.

The second method can in particular be a method for identification of persons by means of 3D cameras, for example, TOF cameras, namely cameras which measure distances by means of a time of flight method (TOF), stereo cameras or PMD cameras, namely TOF cameras comprising a photomixing detector which enable precise detection of the position of persons by means of image analysis.

According to one embodiment of the invention, trinocular cameras can be used which each comprise three individual cameras at different distances from one another, which are arranged in a row, wherein respectively two of these individual cameras act as a stereo camera. Advantageously the different possible combinations of the individual cameras to form a stereo camera enable a wide variation of the possible focal widths of the temporary complete system and therefore an optimal analysis of the area-of-interest (AoI), namely the entry area of the access monitoring system.

In this case, a suitable evaluation, e.g. using the census transformation well known to the person skilled in the art and combining the images of each individual camera yields a stereo image which also contains depth information about the persons and objects located in the area of observation. The evaluation can be made on the camera itself or on a computer assigned to the camera. Depending on the equipment of the computer components, by optimizing the parameters resolution/mono-image rate/stereo image rate/selected algorithm/allowed delay (real time capability), different performance demands on the system are possible which allow an optimal and efficient adaptation of the system in the field to the respective circumstances.

The depth information obtained can be further used in a next step to isolate persons in the image, therefore to detect their presence and finally be able to carry out a determination of position. Here the person skilled in the art is familiar with numerous different methods from the literature which are based on the analysis and extraction of textures in an image, methods based on the analysis and interpolation of movement by means of a plurality of consecutive images as well as model-based approaches which can either be implemented monolytically in the context of person identification, to analyze the human body as a whole or part-based, i.e. to detect individual parts of the human body and combine these according to suitable hypotheses to form a complete body. The latter approach is particularly suitable for the case that a partial masking of a person takes place.

According to one embodiment of the invention, in a next step as part of a training phase, typical partial contours of the objects to be studied are derived from image sequences and stored in a database. For this purpose the textures in the image to be studied, can be emphasized previously, e.g. with anisotropic filters which are typically used in 3D analysis methods and are well known in the literature. The advantage of the method of texture identification is that different templates can be stored depending on the area of application, which optimize the results; for example, templates containing a helmet are stored for an access monitoring system for a ski area. Thus, there is an optimal set of detection parameters for each case of application. Since the textures produced are simple, these can also easily be subjected to transformations in real time such as compressions, rotations or stretchings. Thus, these textures can then be found again in the image when the person turns round or the distance to persons changes.

In a next step, a further set of information can be produced from the image which can be obtained by the so-called "approximate texture context" analysis. Here small, less complex 2D structures are extracted from the images. Typical structures of this type which occur in human bodies are then stored in a codebook. In this case, information on the mutual local correlation in the image between the individual structures can also be stored. By means of suitable statistical methods, these individual structures are then checked for their position with respect to one another. If this check reveals that as a result of the position of the structures with respect to one another and the individual properties of the structures in detail, it is plausible that a set of these structures describes a human person, this subset is also characterized as such and the corresponding image area acquires a (virtual) bounding box for indicating the presence of a human person.

In a further step, the above approaches can be combined by applying, for example a maximum a posteriori estimation method which is well known to the person skilled in the art in this area. The result yields a robust estimator for the individual position and also posture (e.g. body posture, body turning, head turning, arm alignment) of the persons in the image.

Knowing the surroundings and the position of the camera in absolute x-y-(z) coordinates, this information can then be converted into the real surroundings which can subsequently be used as the basis of localization, counting and tracking of persons by means of the second imaging method.

In a further form of the method, the existing infrastructure can equally well be used for detecting non-persons in the image, i.e. objects such as, for example, cases, stones, heaps of snow. The operator of the access monitoring system can hereby be automatically warned of risks, e.g. risk of stumbling, risk of queues, unauthorized parking of objects etc. in the entry area and then warn the user.

As a result of the concept according to the invention, the data carriers or the mobile electronic devices on which a valid access authorization or an ID to which an access authorization is unambiguously assigned are stored and thus the persons who are carrying at least one valid access authorization in the form of a data carrier or a mobile electronic device on which a valid access authorization or an ID to which an access authorization is unambiguously assigned and all persons present in the entry area are detected spatially in real time so that an ID map and a people map are created in the server.

The ID map corresponds to the spatial distribution of persons who are carrying at least one valid access authorization in the form of a data carrier or a mobile electronic device on which a valid access authorization or an ID to which an access authorization is unambiguously assigned is stored wherein the people map corresponds to the spatial distribution of all persons in the entry area of the access monitoring system.

In a next step the data delivered by the two methods are compared in the server in order to identify in the course of a matching of the ID map with the people map the persons who are carrying at least one valid access authorization in the form of a data carrier or a mobile electronic device on which a valid access authorization or an ID to which an access authorization is unambiguously assigned is stored and the persons without a valid access authorization. Here it is determined whether the determined position of a person detected by means of the second imaging method corresponds to a position, determined by means of the first method, of a data carrier or a mobile electronic device on which a valid access authorization or an ID to which at least one access authorization is unambiguously assigned, is stored. If this is not the case, a person who has no access authorization or no valid access authorization is detected and localized.

As a result of the matching, i.e. the assignment of the valid access authorizations detected by means of the first method to the persons detected by means of the second method, a so-called overlay map is created, which represents the distribution of the assignment and the non-assigned persons and/or access authorizations.

The parallel implementation of the detection of the data carriers or the mobile electronic devices on which a valid access authorization or an ID to which an access authorization is unambiguously assigned is stored by means of the first method and the persons present by means of the second method and the subsequent matching are carried out continuously so that this information is present in real time and a movement profile of the persons who have been identified as persons without a valid access authorization and the persons who are carrying a valid access authorization in the form of a data carrier or a mobile electronic device on which a valid access authorization or an ID to which an access authorization is unambiguously assigned is created.

According to the invention, the movement profiles are evaluated in the server in real time according to the overlay map, wherein if, in an access monitoring system which has no access monitoring devices comprising barriers, persons who, according to the overlay map, are carrying a valid access authorization in the form of a data carrier or a mobile electronic device on which a valid access authorization or an ID to which an access authorization is unambiguously assigned is stored, pass a predefined virtual line which corresponds to access into the area monitored by the access monitoring system, a corresponding entry is made in a server of the access monitoring system.

If, according to the overlay map, persons identified as persons without a valid access authorization pass the predefined virtual line, an unauthorized access is identified. In this way, an access monitoring system without barriers is achieved. Furthermore the corresponding access monitoring devices are omitted.

For the case of an unauthorized access of a person, a tracking of this person can be executed by means of at least one further camera, wherein a manual access monitoring is preferably performed by means of the tracking information. In the course of further embodiments, this person can be marked by means of a laser or light beam in order in this way to simplify the location of the person by members of staff. According to a further embodiment, if an unauthorized access of a person is detected, a group of persons including the person without valid access authorization is diverted by activating means for diverting persons, for example, turnstiles, wherein the group of persons is diverted in such a manner that means for monitoring access authorizations comprising an access monitoring device with mechanical barrier, wherein the access authorizations can be read contactlessly, are passed. The means for diverting persons can be activated automatically or manually by activating a switch or a mechanical device.

The access monitoring system accordingly comprises at least three reading devices connected to a server, provided in the entry area, which cover the entire entry area for contactless detection and reading of access authorizations or IDs to which at least one access authorization is unambiguously assigned, stored on data carriers or mobile electronic devices, as well as a plurality of cameras connected to the server in the entry area of the access monitoring system, which cover the entire entry area. In the event that several entry areas are provided, the access monitoring system per entry area comprises at least reading devices and a plurality of cameras. In order to avoid an unauthorized access via an exit area, the exit areas are entry areas in the sense of the invention.

In the course of a further development of the invention, for the case of personal access authorizations which are detected by means of the first method, it can be determined by means of the second imaging method whether these access authorization are illegitimately being misused by other persons. This is accomplished by means of a comparison of a photo of an authorized person stored in a database with a photo of the person created by means of the second method, who carries a personal access authorization stored on a data carrier or a mobile electronic device or ID to which at least one valid personal access authorization is unambiguously assigned. Similarly to this procedure, it can be determined whether an adult with an access authorization for a child is misusing this access authorization.

In the course of a further development of the invention, the matching of the ID map with the people map can be optimized by means of a maximum likelihood approach (ML) and optionally additionally by means of the combination of a maximum likelihood approaches (ML) and fuzzy logic (FL).

In this case, maps are generated from the people map and the ID map which, in addition to the positions of the detected persons or the detected data carriers or the detected mobile electronic devices on which a valid access authorization or an ID to which an access authorization is unambiguously assigned, are stored, also contain a statistical reliability of these positions derived therefrom. The statistical reliability can, for example, be calculated for example from the experience of known standard deviations and/or systematic errors of the method to be derived from the surroundings.

The two maps are then made to coincide in the best possible manner by means of a maximum likelihood approach in the sense of statistical probability in the course of a matching, wherein probabilities of the agreement of the localization results of both maps are calculated and wherein initially the points with the highest mutual probabilities are linked to one another.

According to a further development of the method, further information about the relationship of individual IDs or access authorizations with respect to one another can be provided, e.g. a group of IDs can represent a family which preferably appears together. Other "soft" factors of this type can help to increase the precision of the approach by means of fuzzy logic. When suitably modelled, different information can be linked to one another. For example, the information "father and son each have matching IDs and preferably stand next to one another" together with the information "there is a small person with matching ID in the entry area" can be mapped in assignment probabilities where such links combined with matching according to the maximum likelihood approach enable a more reliable matching of the people map with the ID map.

Furthermore, in order to optimize the matching of the people map with the ID map according to the invention, not only the current position but also the time profile of the people map and the ID map can also be used. When persons detected in the time profile and detected data carriers or mobile electronic devices move in a comparable pattern, these can be reliably linked to one another. In this case, the use of the time profiles of the people map and the ID map can additionally be optimized according to the maximum likelihood approach in order to be able to compensate for statistical deviations over time, for example, a shading in the image of the imaging method and/or shading in the frequency of the first method, interference of the wireless surroundings due to external equipment, weather-induced unfavourable optical conditions such as, for example snowfall, by means of the probability of occurrence.

BRIEF DESCRIPTION OF THE DRAWING

The invention is explained in detail with reference to the appended FIGURE which shows a flow diagram of a possible embodiment of the method.

DETAILED DESCRIPTION OF THE INVENTION

At the beginning of the method, the system in which the method is implemented is in idle mode, wherein when a device for carrying out the second imaging method, i.e. a camera, detects an object in the area of coverage of the camera which corresponds to a part of the entry area of the access monitoring system, which object is classified as a person, which can be accomplished for example by means of the described analysis and extraction of textures, the current position of the person is detected and transferred to an algorithm for generating the people map, wherein these steps are repeated until all the objects currently classified as persons are detected in the area of coverage of the camera and their current positions have been transferred to the algorithm for generating the people map.

Directly after this step or as illustrated by means of the appended FIGURE, at the same time as the detection of the persons by the imaging method, by means of at least three reading devices which are provided in the entry area of the access monitoring system and which cover the entire entry area, the data carriers or the mobile electronic devices on which a valid access authorization or an ID to which an access authorization is unambiguously assigned, are stored, are detected contactlessly (wireless) and their current position is determined by trilateration or multilateration and is transferred to an algorithm to generate the people map. By detecting the data carriers or the mobile electronic devices on which a valid access authorization or an ID to which an access authorization is unambiguously assigned, are stored, the persons who have at least one valid access authorization in the form of a data carrier or a mobile electronic device on which a valid access authorization or an ID to which an access authorization is unambiguously assigned, are stored, are implicitly detected.

In a next step, the data delivered by the two methods are compared in the server in order to identify in the course of a matching of the ID map with the people map the persons who have at least one valid access authorization in the form of a data carrier or a mobile electronic device on which a valid access authorization or an ID to which an access authorization is unambiguously assigned, are stored. It is hereby determined whether the determined position of a person detected by means of the second imaging method corresponds to a position, determined by means of the first method, of a data carrier or a mobile electronic device on which a valid access authorization or an ID to which at least one valid access authorization is unambiguously assigned, are stored. If this is not the case a person who has no access authorization or no valid access authorization is detected and localized.

As a result of the matching, i.e. the assignment of the valid access authorizations detected by means of the first method to the persons detected by means of the second method, a overlay map is created, which represents the distribution of the assignment and the non-assigned persons and/or access authorizations.

The parallel implementation of the detection of the data carriers or the mobile electronic devices on which a valid access authorization or an ID to which an access authorization is unambiguously assigned is stored by means of the first method and the persons present by means of the second method and the subsequent matching are carried out continuously so that this information is present in real time and a movement profile of the persons who have been identified as persons without a valid access authorization and the persons who are carrying a valid access authorization is created.

The movement profiles are evaluated in the server in real time according to the overlay map, wherein if, in an access monitoring system which has no access monitoring devices comprising barriers, persons who, according to the overlay map, are carrying a valid access authorization in the form of a data carrier or a mobile electronic device on which a valid access authorization or an ID to which an access authorization is unambiguously assigned is stored, pass a predefined virtual line which corresponds to access into the area monitored by the access monitoring system, according to an access procedure which is released when according to the overlay map, persons having a valid access authorization are located close to the access area, i.e. the virtual line, a corresponding entry for this access authorization access authorization is made in a server of the access monitoring system. After passing the virtual line, the access procedure for this access authorization is blocked for a certain time interval so that a renewed passage of the virtual line with this access authorization is classified as misuse.

If, according to the overlay map, persons identified as persons without a valid access authorization pass the predefined virtual line, an unauthorized access is identified. In this way, an access monitoring system without barriers is achieved. The data are transferred to another external algorithm for misuse analysis.

The invention claimed is:

1. A method of monitoring access authorizations by an access monitoring system with which access authorizations or IDs stored on data carriers or mobile electronic devices, to which at least one access authorization is unambiguously assigned, are detected contactless and read out by reading devices connected to a server, the method comprising:
    defining an authorized data carrier or an authorized mobile electronic device as being a data carrier or a mobile electronic device on which is stored either a valid access authorization or an ID to which the valid access authorization is unambiguously assigned,
    providing, in each entry area of the access monitoring system, at least three reading devices which cover an entirety of the entry area,
    providing, in each entry area of the access monitoring system, a plurality of cameras that are connected to the server which cover the entire entry area,
    during a first method, determining a current position of the authorized data carrier or the authorized mobile electronic device by at least three reading devices by trilateration or multilateration by detecting the authorized data carrier or the authorized mobile electronic device, and
    during a second imaging method, which is carried out parallel to the first method, detecting a current position of all persons present in the entry area of the access monitoring system by the plurality of cameras,
    detecting, spatially in real time, persons carrying at least one valid access authorization in a form of an authorized data carrier or an authorized mobile electronic device and all persons present in the entry area so that an ID map and a people map is created in the server,
        the ID map corresponding to a spatial distribution of the persons who are carrying at least one valid access authorization in the form of an authorized data carrier or an authorized mobile electronic device, and the people map corresponding to a spatial distribution of all the persons in the entry area of the access monitoring system,
    comparing data delivered by the first and the second methods in the server in order to create an overlay map in a course of a matching of the ID map with the people map to identify the persons who are carrying at least one valid access authorization in the form of an authorized data carrier or an authorized mobile electronic device and the persons without a valid access authorization, determining whether the determined position of a person detected by the second imaging method corresponds to a position, determined by the first method, of an authorized data carrier or an authorized mobile electronic device, if this is not the case, detecting and localizing a person who has no valid access authorization, the movement profiles are evaluated in real time according to the overlay map, if persons who, according to the overlay map, are carrying a valid access authorization, pass a predefined virtual line which corresponds to access into the area monitored by the access monitoring system, making a corresponding entry in a server of the access monitoring system and if, according to the overlay map, persons identified as persons without a valid access authorization pass the predefined virtual line, identifying an unauthorized access whereby the access monitoring system is achieved without barriers.

2. The method of monitoring access authorizations by the access monitoring system according to claim 1, further comprising, if an unauthorized access is identified, executing a tracking of the person without a valid access authorization by at least one further camera, a manual access monitoring is performed by the tracking information or if an unauthorized access of a person is detected, a group of persons including the person without access authorization is diverted by activating means for diverting persons, the group of persons is diverted in such a manner that means for monitoring access authorizations comprising an access authorization with mechanical barrier, wherein the access authorizations can be read contactlessly, are passed.

3. The method of monitoring access authorizations by the access monitoring system according to claim 1, further comprising, for personal access authorizations which are detected by the first method, determining by the second imaging method whether the personal access authorizations are illegitimately being misused by other persons, by comparing of a photo of an authorized person stored in a database with a photo of the person created by the second method, who carries the personal access authorization stored on an authorized data carrier or an authorized mobile electronic device.

4. The method of monitoring access authorizations by the access monitoring system according to claim 1, further comprising optimizing the matching of the ID map with the people map by a combination of maximum likelihood approaches (ML) and fuzzy logic (FL), further maps are generated from the people map and the ID map which, in addition to the positions of the detected persons or the detected data carriers or the detected mobile electronic devices on which a valid access authorization or an ID to which an access authorization is unambiguously assigned, are stored, also contain a statistical reliability of these positions derived therefrom, the ID map and the people map are made to coincide in a best possible manner by means of a maximum likelihood approach in a sense of statistical probability in the course of a matching, probabilities of the agreement of the localization results of both maps are calculated and points with highest mutual probabilities are linked to one another.

5. The method of monitoring access authorizations by the access monitoring system according to claim 4, further comprising optimizing the matching of the people map with the ID map, using a time profile of the people map and the ID map, such that when persons detected in the time profile and detected data carriers or mobile electronic devices move in a comparable pattern, the persons are reliably linked to one another.

6. The method of monitoring access authorizations by the access monitoring system according claim 1, further comprising defining the second imaging method as a method for identification of persons by 3D cameras, stereo cameras or PMD cameras which enables a precise detection of the position of persons by image analysis.

7. A method of monitoring access authorizations by an access monitoring system, with which access authorizations or IDs stored on data carriers or mobile electronic devices, to which at least one access authorization is unambiguously assigned, are detected contactless and read out by reading devices connected to a server, the method comprising:

defining an authorized data carrier or an authorized mobile electronic device as being a data carrier or a mobile electronic device on which is stored either a valid access authorization or an ID to which the valid access authorization is unambiguously assigned, providing, in each entry area of the access monitoring system, at least three reading devices which cover an entirety of the entry area, providing, in each entry area of the access monitoring system, a plurality of cameras that are connected to the server which cover the entire entry area, during a first method, determining a current position of the authorized data carrier or the authorized mobile electronic device by at least three reading devices by trilateration or multilateration by detecting the authorized data carrier or the authorized mobile electronic device, and during a second imaging method, which is carried out parallel to the first method, detecting a current position of all persons present in the entry area of the access monitoring system by the plurality of cameras, detecting, spatially in real time, persons carrying at least one valid access authorization in a form of an authorized data carrier or an authorized mobile electronic device and all persons present in the entry area so that an ID map and a people map is created in the server, the ID map corresponding to a spatial distribution of the persons who are carrying at least one valid access authorization in the form of an authorized data carrier or an authorized mobile electronic device, and the people map corresponding to a spatial distribution of all the persons in the entry area of the access monitoring system, comparing data delivered by the first and the second methods in the server in order to create an overlay map in a course of a matching of the ID map with the people map to identify the persons who are carrying at least one valid access authorization in the form of an authorized data carrier or an authorized mobile electronic device and the persons without a valid access authorization, determining whether the determined position of a person detected by the second imaging method corresponds to a position, determined by the first method, of an authorized data carrier or an authorized mobile electronic device, if this is not the case, detecting and localizing a person who has no valid access authorization, the movement profiles are evaluated in real time according to the overlay map, if persons who, according to the overlay map, are carrying a valid access authorization, pass a predefined virtual line which corresponds to access into the area monitored by the access monitoring system, making a corresponding entry in a server of the access monitoring system and if, according to the overlay map, persons identified as persons without a valid access authorization pass the predefined virtual line, identifying an unauthorized access whereby the access monitoring systems is achieved without barriers, and defining the first method as a method in which data carriers or mobile electronic devices transmit, via a Bluetooth low energy standard (BLE) in the course of a "broadcasting" at regular intervals, an ID which is unambiguously assigned to at least one access authorization or data of an access authorization which is received by the Bluetooth low energy standard transmission-receiving units connected to a computer comprising a central processing unit and storage means in range of the mobile electronic device or the data carrier, the localization of the mobile electronic device or the data carrier is made by determining the distance between the mobile electronic device and the Bluetooth low energy standard transmission-receiving units by a reference signal strength which usually corresponds to the signal strength at a meter distance and which is contained as information in the signal of the mobile electronic device or the data carrier or is stored in a table stored in the computer depending on the mobile electronic device or the data carrier, then a trilateration or in the case of more than three Bluetooth low energy standard transmission-receiving units, a multilateration is performed.

8. A method of monitoring access authorizations by an access monitoring system, with which access authorizations or IDs stored on data carriers or mobile electronic devices, to which at least one access authorization is unambiguously assigned, are detected contactless and read out by reading devices connected to a server, the method comprising:

defining an authorized data carrier or an authorized mobile electronic device as being a data carrier or a mobile electronic device on which is stored either a valid access authorization or an ID to which the valid access authorization is unambiguously assigned, providing, in each entry area of the access monitoring system, at least three reading devices which cover an entirety of the entry area, providing, in each entry area of the access monitoring system, a plurality of cameras that are connected to the server which cover the entire entry area, during a first method, determining a current position of the authorized data carrier or the authorized mobile electronic device by at least three reading devices by trilateration or multilateration by detecting the authorized data carrier or the authorized mobile electronic device, and during a second imaging method, which is carried out parallel to the first method, detecting a current position of all persons present in the entry area of the access monitoring system by the plurality of cameras, detecting, spatially in real time, persons carrying at least one valid access authorization in a form of an authorized data carrier or an authorized mobile electronic device and all persons present in the entry area so that an ID map and a people map is created in the server, the ID map corresponding to a spatial distribution of the persons who are carrying at least one valid access authorization in the form of an authorized data carrier or an authorized mobile electronic device, and the people map corresponding to a spatial distribution of all the persons in the entry area of the access monitoring system, comparing data delivered by the first and the second methods in the server in order to create an overlay map in a course of a matching of the ID map with the people map to identify the persons who are carrying at least one valid access authorization in the form of an authorized data carrier or an authorized mobile electronic device and the persons without a valid access authorization, determining whether the determined position of a person detected by the second imaging method corresponds to a position, determined by the first method, of an authorized data carrier or an authorized mobile electronic device, if this is not the case, detecting and localizing a person who has no valid access authorization, the movement profiles are evaluated in real time according to the overlay map, if persons who, according to the overlay map, are carrying a valid access authorization, pass a predefined virtual line which corresponds to access into the area monitored by the access monitoring system, making a corresponding entry in a server of the access monitoring system and if, according to the overlay map, persons identified as persons without a valid access authorization pass the predefined virtual line, identifying an unauthorized access whereby the access monitoring system is achieved without barriers, and carrying out the second imaging method using trinocular cameras which each comprise three individual cameras at different distances, which are arranged in a row, respectively two of these individual cameras act as a stereo camera, different possible combinations of the individual cameras form a stereo camera and enable a wide variation of possible focal widths and an optimal analysis of the entry area of the access monitoring system.

* * * * *